United States Patent
Cruz et al.

(10) Patent No.: US 9,934,890 B1
(45) Date of Patent: Apr. 3, 2018

(54) STACKABLE ELECTRIC FENCE WIRE INSULATORS

(71) Applicant: Woodstream Corporation, Lititz, PA (US)

(72) Inventors: Robert Theodore Cruz, Lititz, PA (US); Andrew Baker Woolworth, Lancaster, PA (US)

(73) Assignee: WOODSTREAM CORPORATION, Lititz, PA (US)

( * ) Notice: Subject to any disclaimer, the term of this patent is extended or adjusted under 35 U.S.C. 154(b) by 0 days.

(21) Appl. No.: 15/273,996

(22) Filed: Sep. 23, 2016

(51) Int. Cl.
*H01B 17/14* (2006.01)
*A01K 15/02* (2006.01)

(52) U.S. Cl.
CPC ......... *H01B 17/145* (2013.01); *A01K 15/023* (2013.01)

(58) Field of Classification Search
CPC ...... H01B 17/145; H01B 17/16; H01B 17/18; H01B 17/00; H01B 17/005; H01B 17/14; H01B 17/20; H01B 17/22; A01K 15/023
USPC .............. 174/135, 166, 158 F, 137 R, 138 F, 174/161 F, 138 G, 163 F, 50, 68.1, 68.3; 385/134, 135; 256/10
See application file for complete search history.

(56) References Cited

U.S. PATENT DOCUMENTS

| | | | | |
|---|---|---|---|---|
| 4,263,477 A * | 4/1981 | Wilson, Sr. | .......... | H01B 17/145 174/158 F |
| 4,771,137 A * | 9/1988 | Thompson | .......... | H01B 17/145 174/163 F |
| 4,905,968 A * | 3/1990 | Eby | ....................... | H01B 17/145 174/158 F |
| 5,063,274 A * | 11/1991 | Johnson | ............... | H01B 17/145 174/158 F |
| 5,663,527 A * | 9/1997 | Hui | ....................... | H02G 3/0437 174/68.3 |
| 6,563,055 B1 * | 5/2003 | Burdick | ............... | H01B 17/145 174/138 G |
| 6,872,892 B1 * | 3/2005 | Burdick | ............... | H01B 17/145 174/163 F |
| 7,216,852 B2 * | 5/2007 | Gravelle | ............... | H01B 17/145 256/10 |
| 7,359,610 B2 * | 4/2008 | Vongseng | ............ | G02B 6/4452 385/134 |
| 7,491,903 B2 * | 2/2009 | Hybiske | ............... | H01R 9/2416 174/135 |
| 7,968,797 B2 * | 6/2011 | Williams | ............... | H01B 17/22 174/138 G |

(Continued)

*Primary Examiner* — Angel R Estrada
(74) *Attorney, Agent, or Firm* — Jacobson Holman, PLLC.

(57) ABSTRACT

A nestable and stackable electric fence insulator is provided having a latching structure by which a plurality of insulators of like construction are oriented, at least partially nested and connected to one another in a secure, space-efficient and organized manner. A plurality of like electric fence insulators, each including a body having a mounting end and an electric fence wire engaging end and including at least one latching structure on an upper surface and at least one latching structure on a lower surface, may be stacked one on top of another in a connected and nested relationship. An electric fence insulator package is also provided that includes multiple electric fence insulators secured to one another in a stacked arrangement by a latching structure formed on each insulator, and a packaging surrounding and containing the stacked arrangement of insulators.

20 Claims, 17 Drawing Sheets

(56) References Cited

U.S. PATENT DOCUMENTS 8,253,016 B1 * 8/2012 Baldwin ................ H02G 3/081
174/50

* cited by examiner

STACKABLE ELECTRIC FENCE WIRE INSULATORS

BACKGROUND OF THE INVENTION

Field of the Invention

The present invention is related to the field of insulators for electric fencing and more particularly to electric fence wire insulators that nest in an interlocked stacked arrangement for improved organization and compact storage, packaging and sale.

Description of the Related Art

Electric fence insulators are currently sold in bulk bags, with a 25 count per bag as shown in FIG. 1 being typical. This form of packaging is bulky and unwieldy as the insulators are randomly arranged and movable within the bag. The conventional bulk bag packaging also has large shipping dimensions and occupies a significant amount of space on the retail shelf. Further, the consumer is faced with a random jumble of insulators that must be individually counted during fence installation, with extra unused insulators requiring a larger storage space than would otherwise be required if the insulators could be better organized.

Accordingly, a need exists for fence insulators that can be organized and packed the most compact form for ease of sale, use and storage.

SUMMARY OF THE INVENTION

In view of the foregoing, the present invention is directed to a plurality of electric fence insulators that are configured to nest and connect with one another for compact storage and improved organization. Each insulator is provided with a latching structure such that when several insulators are stacked upon each other, each insulator connects to an adjacent insulator positioned above and/or below it, A plurality of insulators may thus be organized and coupled together into a single unit that is compact in size and easy to handle. The single unit is readily packaged, such as in shrink wrap or a blister pack, for more efficient use of both shipping and retail space. The present invention is also directed to such a package and insulator stack combination.

Accordingly, it is an object of the present invention to provide an electric fence insulator having a latching structure on both its upper surface and its lower surface for connecting to like insulators above and below it when the insulators are stacked one upon another for shipping, sale and/or storage, the latching structure serving to connect, orient and secure the like insulators one to another.

A further object of the present invention is to provide an electric fence insulator in accordance with the preceding object in which the latching structure includes a latching element formed on each of two opposing ends of each insulator so that adjacent insulators are fitted together at two points to ensure secure attachment.

Another object of the present invention is to provide an electric fence insulator in accordance with the preceding objects in which the latching structure element on each end provides a snap fit engagement with an adjoining insulator.

Yet another object of the present invention is to provide an electric fence insulator in accordance with the preceding objects in which the latching structure element on one end has a snap fit and the latching structure element on the opposite end has a friction fit.

A still further object of the present invention is to provide a plurality of electric fence insulators configured to be nested and connected to one another in a compact arrangement in which the plurality of insulator pieces effective form a single unit that is easily handled.

Still another object of the present invention is to provide a plurality of electric fence insulators in accordance with the preceding objects that, when nested and connected to one another, are secured in streamlined packaging such as shrink wrap, blister packs and the like for reduced shipping dimensions and efficient use of retail space.

Yet another object of the present invention is to provide a package containing a plurality of electric fence insulators in accordance with the preceding objects in which the insulators are stacked and connected to one another as an organized unit of a set number within the package while being readily removable therefrom as a group or separately through ready separation of the insulators from one another one at a time.

A further object of the present invention is to provide a package containing a plurality of electric fence insulators in accordance with the preceding objects, with which the consumer, after opening the package and when installing the fence, does not have to count each insulator as it is installed but can readily determine the number of insulators still in the package due to the remaining insulators being kept oriented and secured to one another by their latching structure.

These together with other objects and advantages which will become subsequently apparent reside in the details of construction and operation as more fully hereinafter described and claimed, reference being had to the accompanying drawings forming a part hereof, wherein like numeral refer to like parts throughout.

DETAILED DESCRIPTION OF THE PREFERRED EMBODIMENTS

Figure 1:
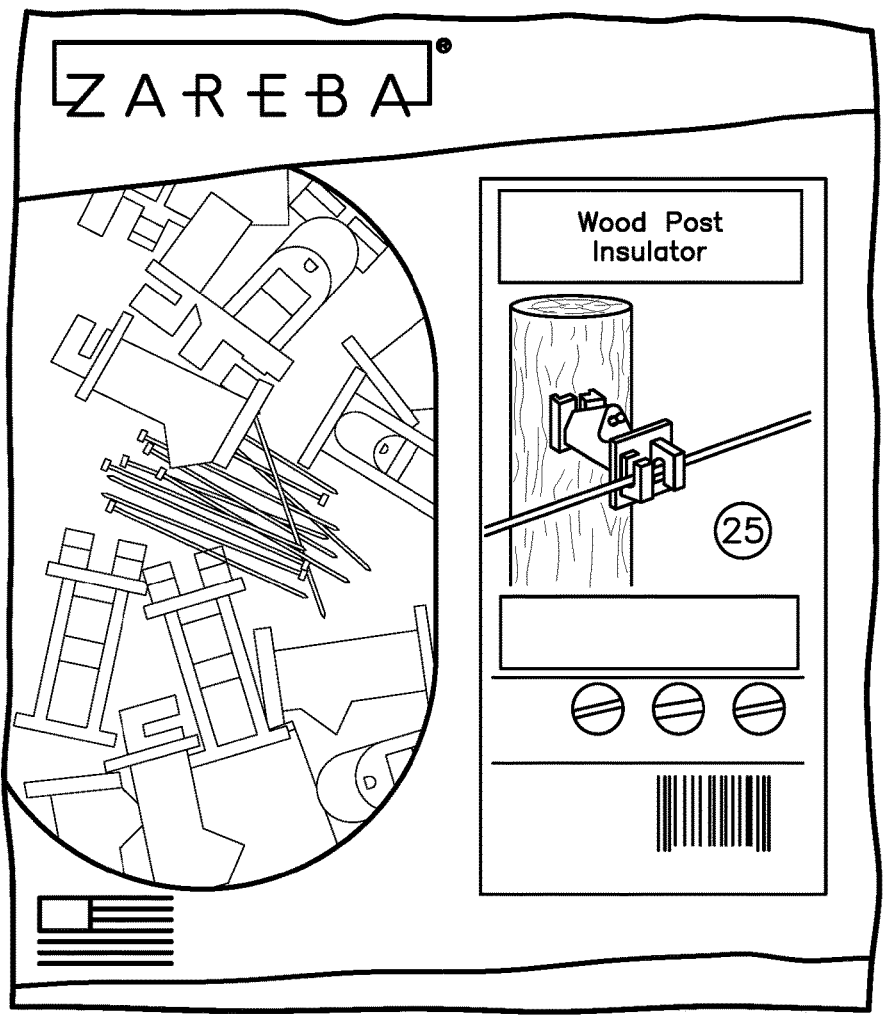
FIG. 1 is a photograph of a bulk bag of conventional insulators as packaged for sale.

While several preferred embodiments of the invention are depicted and explained in detail, it is to be understood that these embodiments are given by way of illustration only. It is not intended that the invention be limited in its scope to the details of construction and arrangement of components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

According to the first embodiment shown in FIGS. 2-10, the present invention is directed to a stackable electric fence insulator generally designated by reference numeral 10. Each insulator 10 has an elongated body, generally designated by reference numeral 12, with a mounting end, generally designated by reference numeral 14, for securing the insulator to a wood post or similar support structure used to define the fence, and an electric fence wire engaging end, generally designated by reference numeral 16, that captures and guides the electric fence wire strung between the posts. As used herein, "post" or "mounting post" is intended to refer to any supporting structure to which the insulator is mounted. A plurality of stackable electric fence insulators 10 when nested and connected together forms a single unit generally designated by reference numeral 20 for organized and space-saving packaging as shown in FIGS. 2 and 21A-21C.

The mounting end 14 of the insulator 10 includes a raised portion 22 having an aperture 24 through which a nail or other fastening element may be inserted and then driven into the post to secure the insulator 10 to the post in the manner known to those skilled in the art. The fence wire engaging end 16 includes two hook-like elements 26, one facing upwardly and the other facing downwardly, through which the electric wire is threaded to string the fence as is also known in the art. As used herein, the terms "upwardly", "upper" and "top" refer to that side what is uppermost when the insulator is oriented for use. Conversely, the terms "downwardly", "lower" and "bottom" refer to the lowermost side of the insulator when oriented for use.

Figure 5:
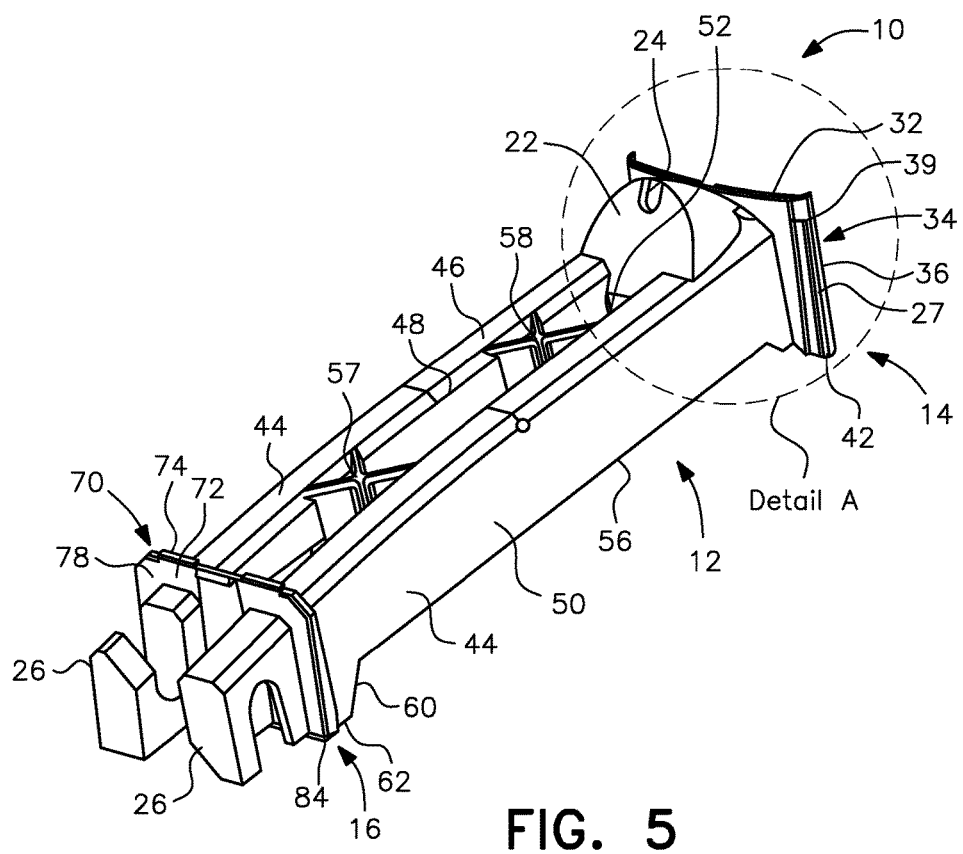
FIG. 5 is a perspective view of the electric fence insulator shown in FIG. 4.
Figure 5A:
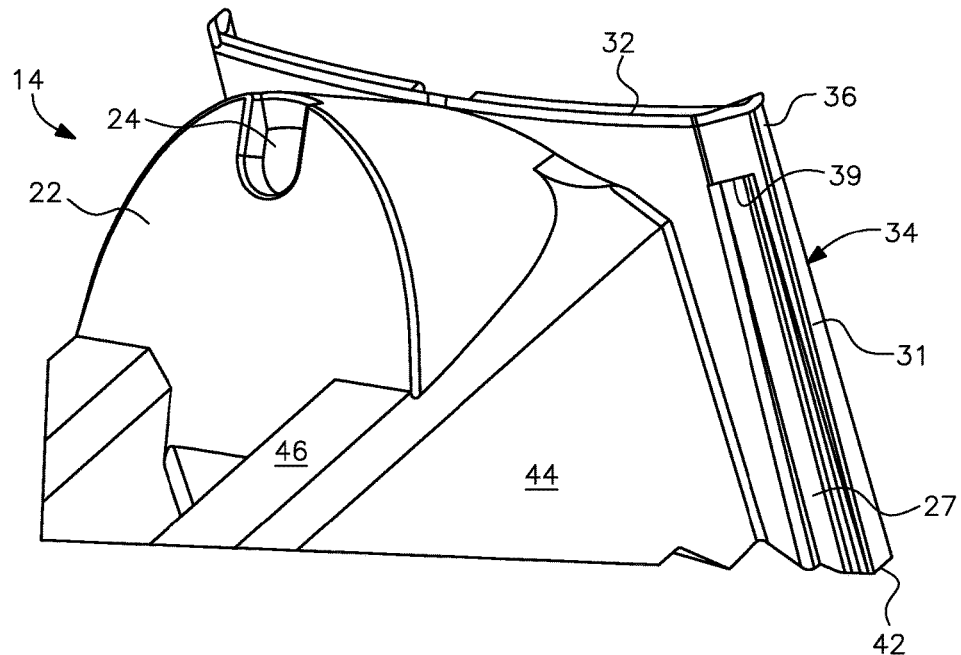
FIG. 5A is an enlarged view of Detail A of FIG. 5.

According to the present invention, the mounting end 14 has a shallow concave outer face 30 with a flat top edge 32 and two straight sides, generally designated by reference numeral 34, that extend substantially perpendicular to the top edge 32. The outermost edges of the sides 34 curve rearwardly, or inwardly toward the concave outer face 30, to form an angled outer edge 36 having a front side 31 and a rear side 33. As shown in FIG. 5A, the front side 31 of the angled outer edge 36 has a slot 27 formed therein that extends upwardly from the bottom of the angled outer edge 36 to end at a point spaced below the flat top edge 32 to form a ledge 39. The slot 27 and the ledge 39 form part of a snap fit connection between the mounting ends of two stacked insulators as will be discussed further hereinafter. As used herein, the terms "rear" and "rearwardly" refer to the end that is nearest to the post to which the insulator is to be mounted. The terms "front" and "forwardly" refer to the end opposite the rear end, or that end nearest the fence wire engaging end.

Figure 9:
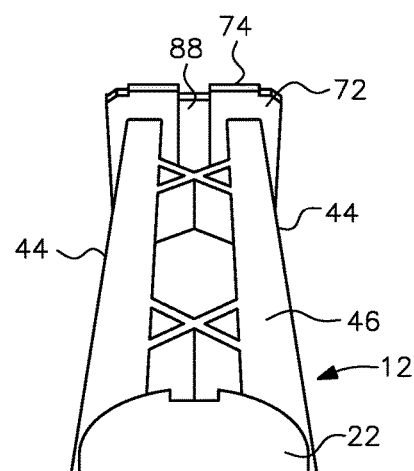
FIG. 9 is a photograph showing an upper perspective view of the insulator shown in FIG. 8 taken from the mounting end.
Figure 9:
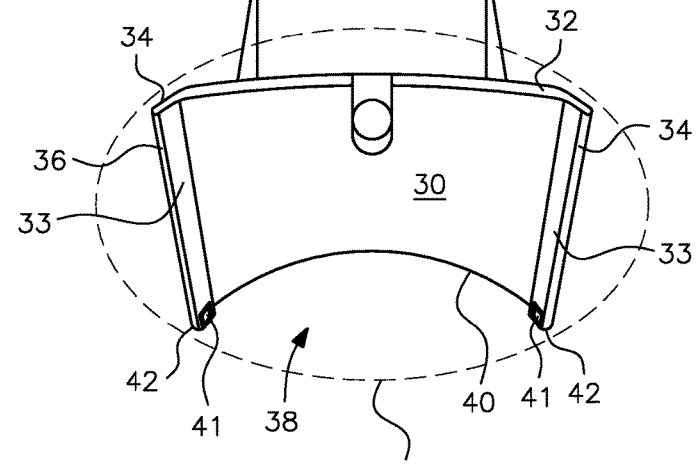
Figure 9A:
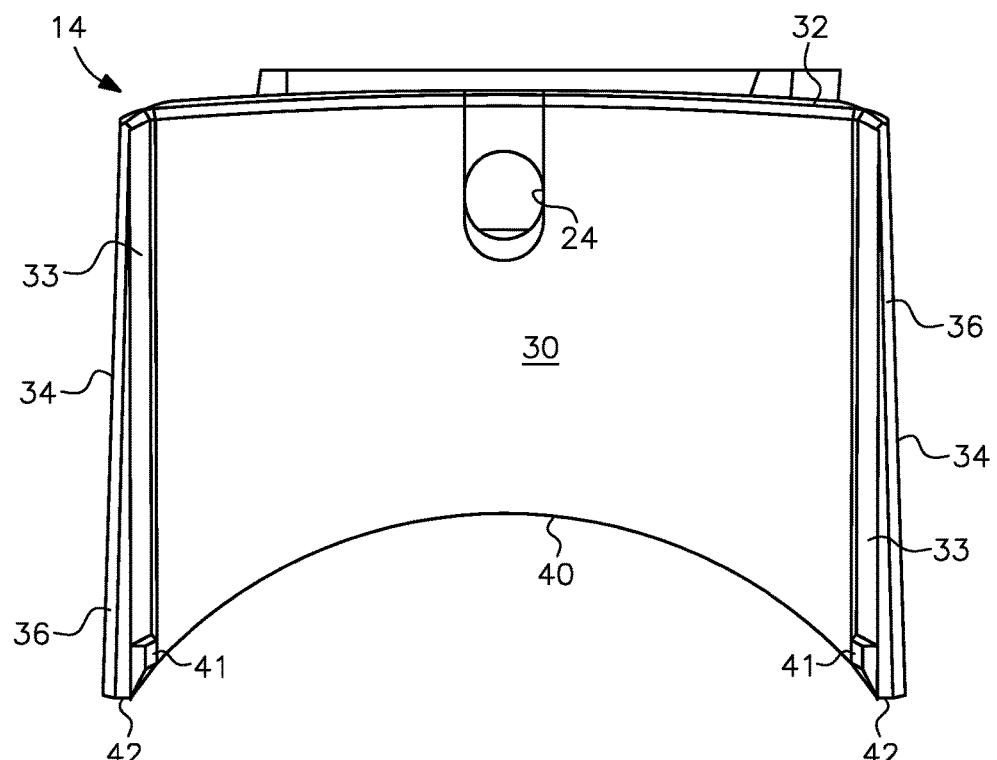
FIG. 9A. is a drawing of Detail A of FIG. 9.

The outer or post abutment face 30 of the mounting end 14 has a lower edge, generally designated by reference numeral 30, with an upwardly arched center 40 to define two outer lugs 42, one at the bottom of each side 34 (see FIGS. 9 and 9A). Hence, when the insulator 10 is placed on a flat surface in an in-use orientation, the mounting end is supported on the two lugs 42 with the upwardly arched center 40 spaced above the flat surface.

As shown in FIGS. 9 and 9A, the lugs include a raised button or bump 41 on the rear side 33 of the angled edge 36. When two insulators are aligned one above the other for stacking and the mounting ends are pressed toward one another, the bumps 41 on the rear sides 33 of the angled edges 36 of the uppermost insulator are pushed past the ledges 39 and into the slots 27 on the front sides 31 of the angled edges 36 of the lowermost insulator to engage the two mounting ends with a snap fit.

Figure 10:
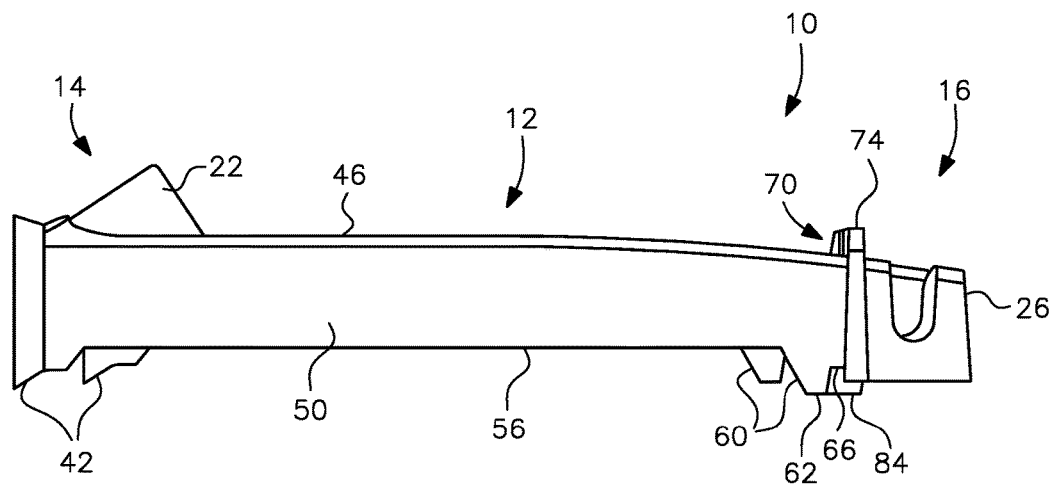
FIG. 10 is a photograph of the insulator shown in FIGS. 8 and 9, taken from the side.
Figure 10A:
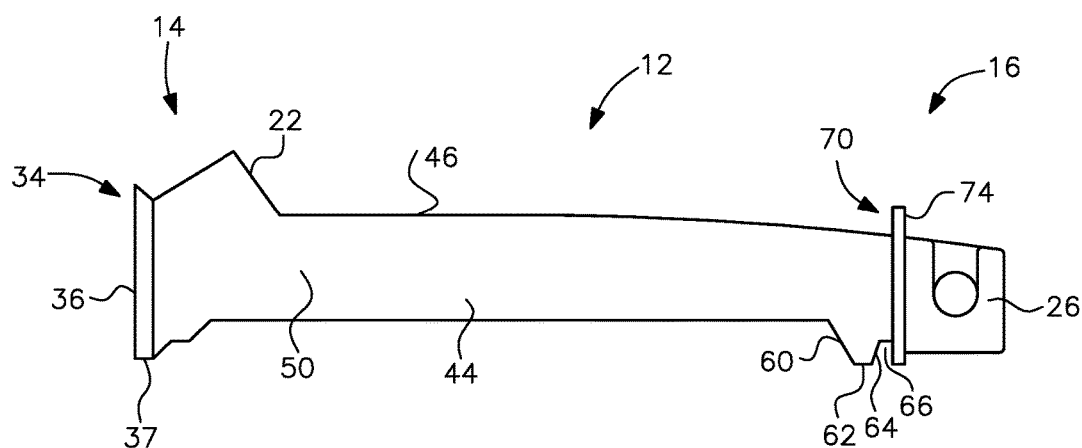
FIG. 10A is a photograph of an alternate version of an insulator according to the first embodiment and showing the optional textured surface on the sides of the arms for grip and on the angled edges of the mounting end for a friction fit with an adjacent insulator when stacked together.
Figure 11:
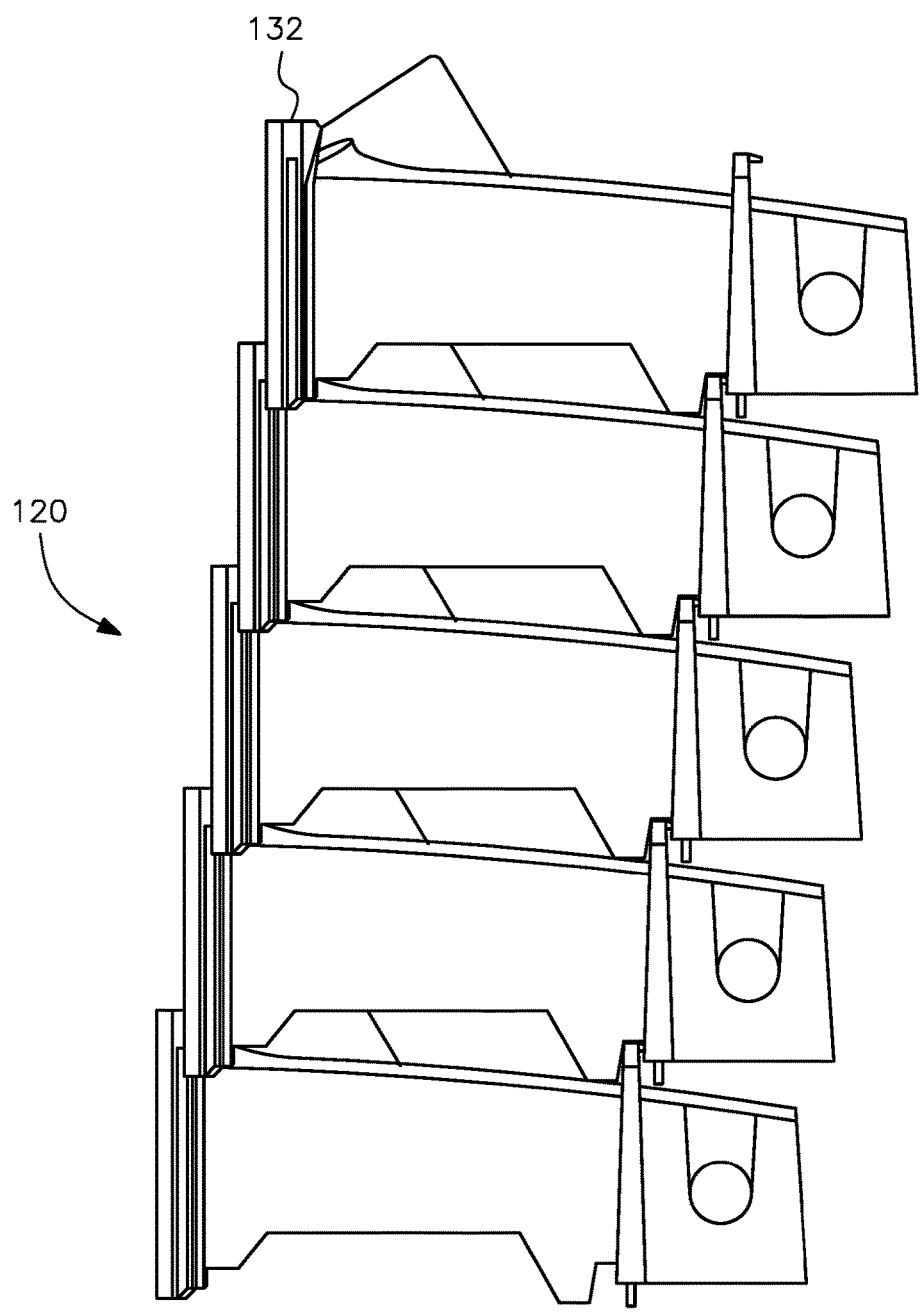
FIG. 11 shows a nested and connected stack of electric fence insulators for a wood post in accordance with a second embodiment of the present invention.
Figure 12:
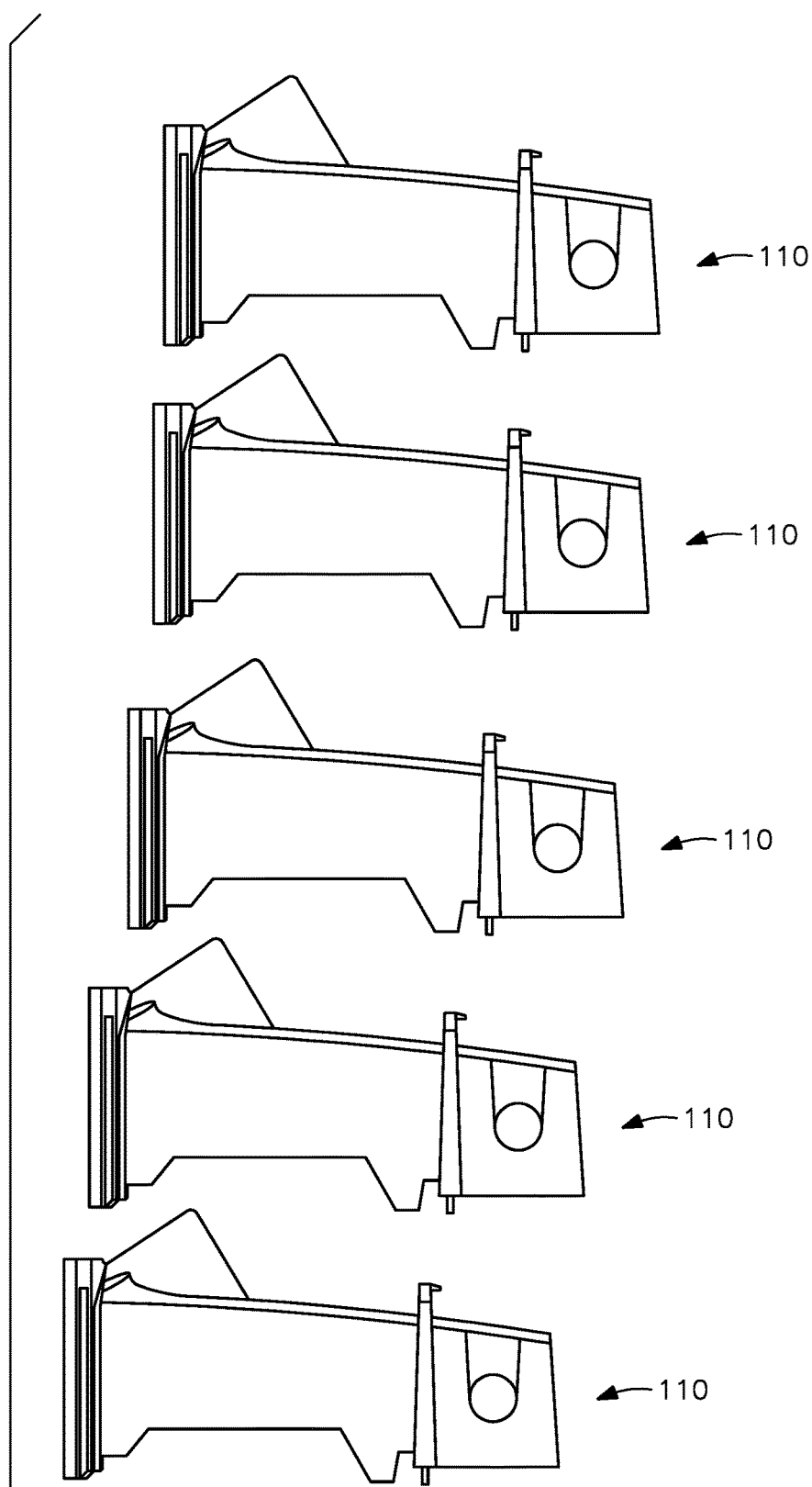
FIG. 12 is an exploded view of the electric fence insulators shown in FIG. 11.
Figure 13:
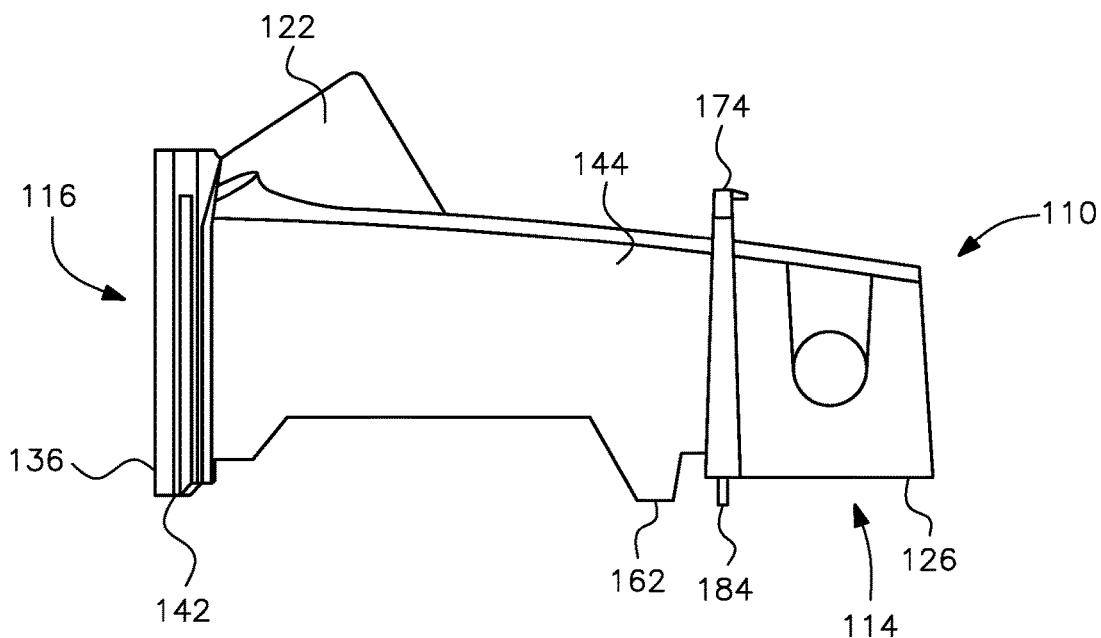
FIG. 13 is a side view of one of the electric fence insulators shown in FIGS. 11 and 12.
Figure 14:
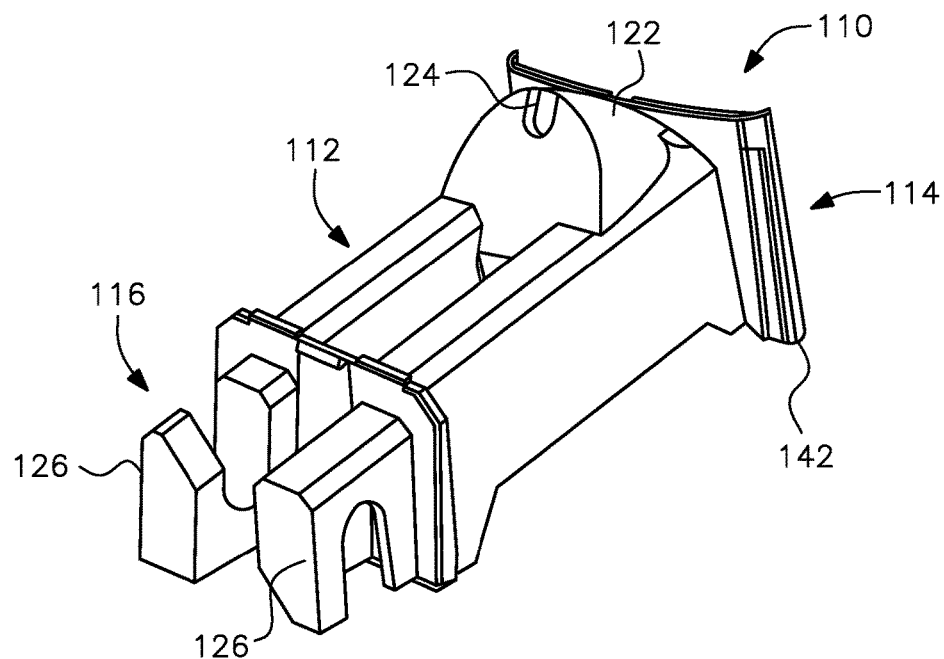
FIG. 14 is a perspective view of the electric fence insulator shown in FIG. 13.
Figure 15:
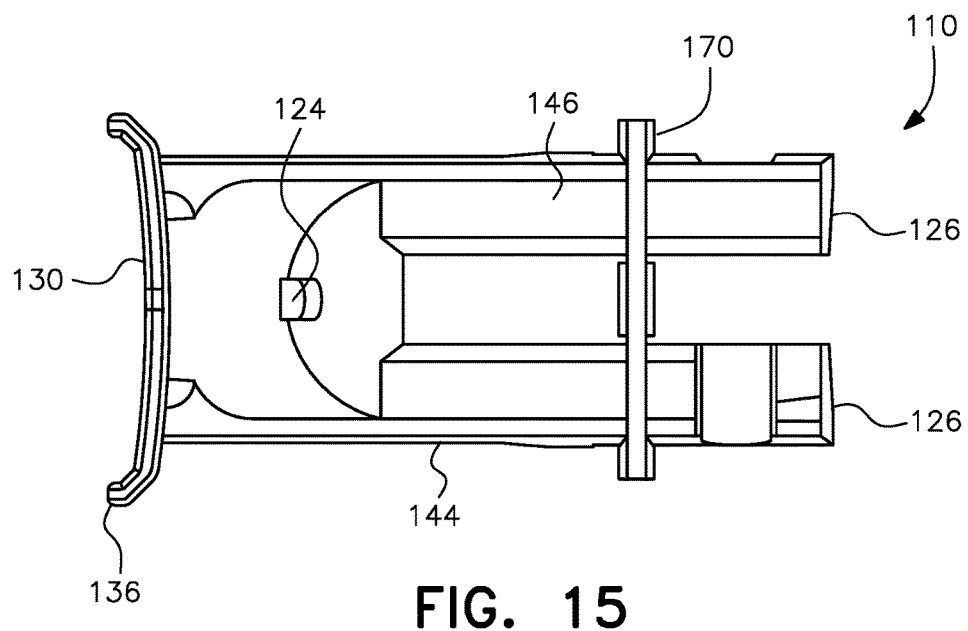
FIG. 15 is a plan view of the insulator shown in FIG. 13.
Figure 16:
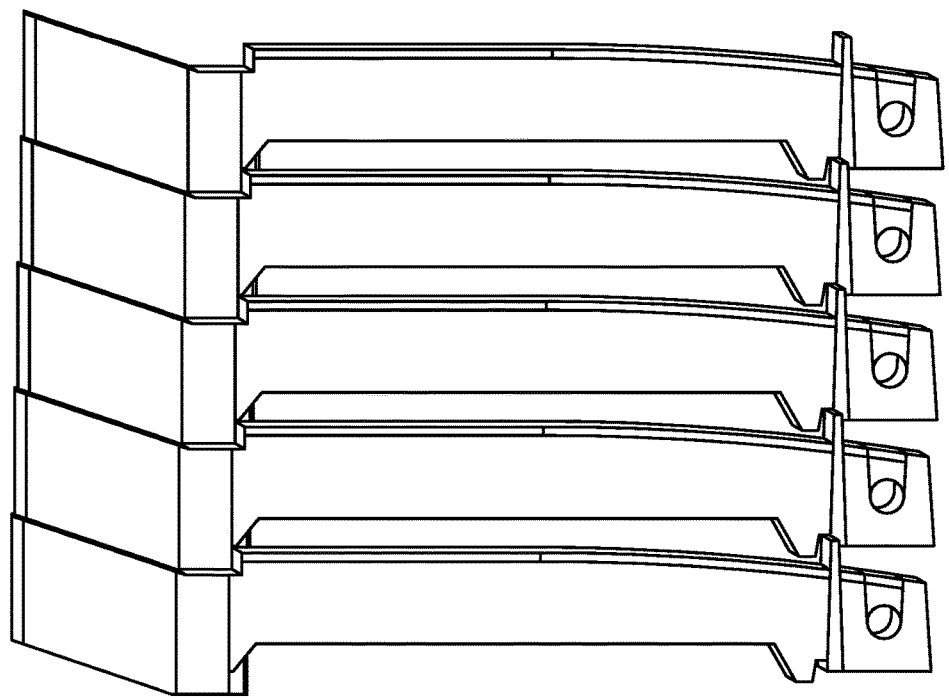
FIG. 16 shows a nested and connected stack of electric fence insulators for a T-post in accordance with a third embodiment of the present invention.
Figure 17:
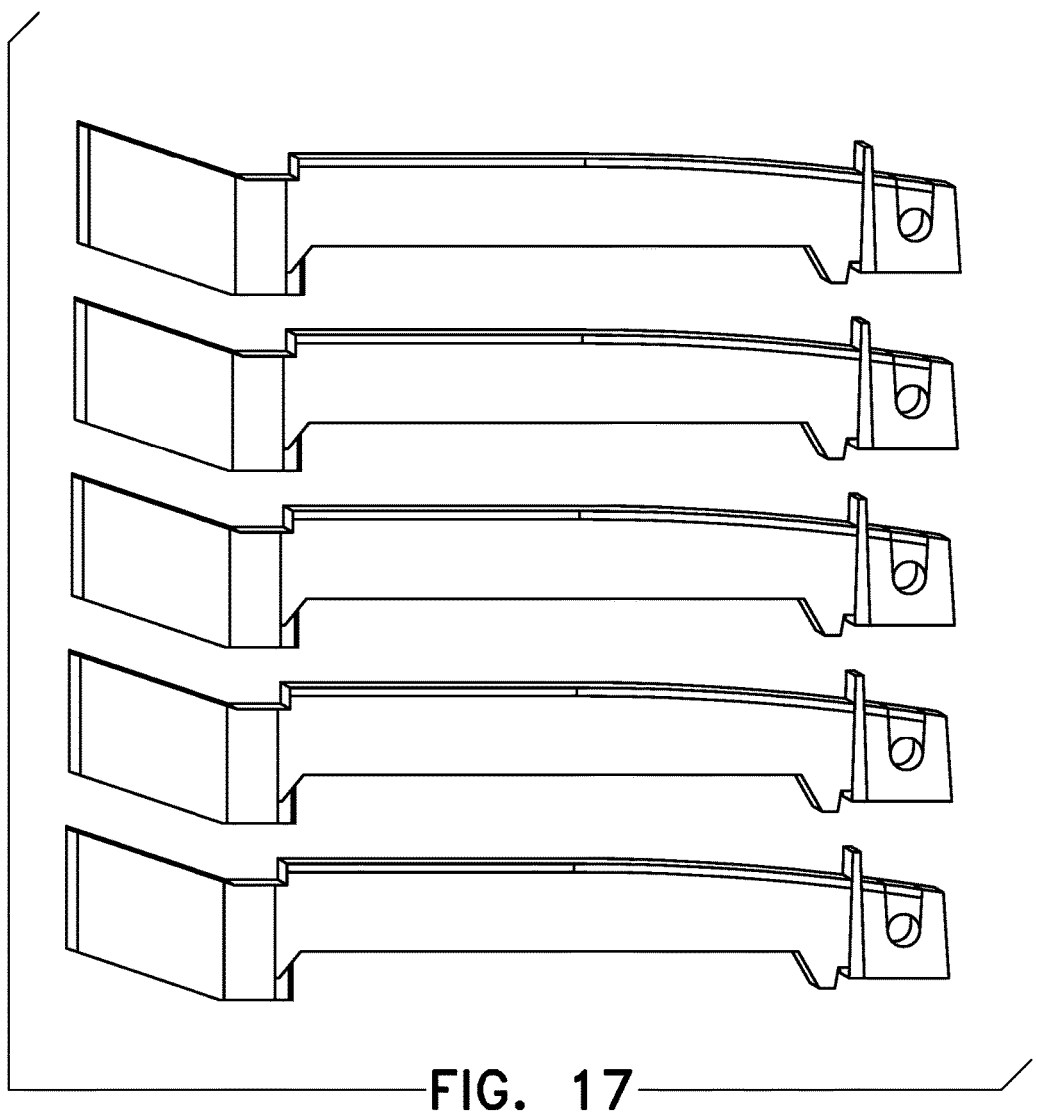
FIG. 17 is an exploded view of the electric fence insulators shown in FIG. 16.
Figure 18:
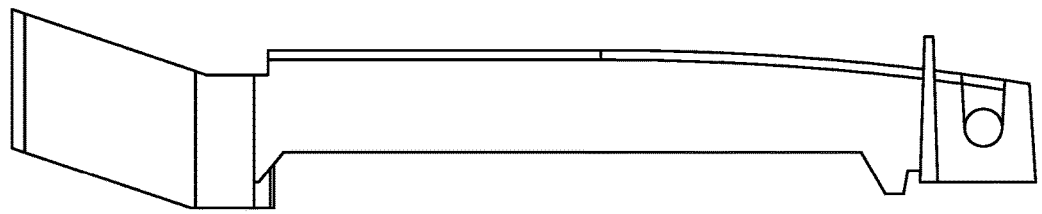
FIG. 18 is a side view of one of the electric fence insulators shown in FIGS. 16 and 17.
Figure 19:
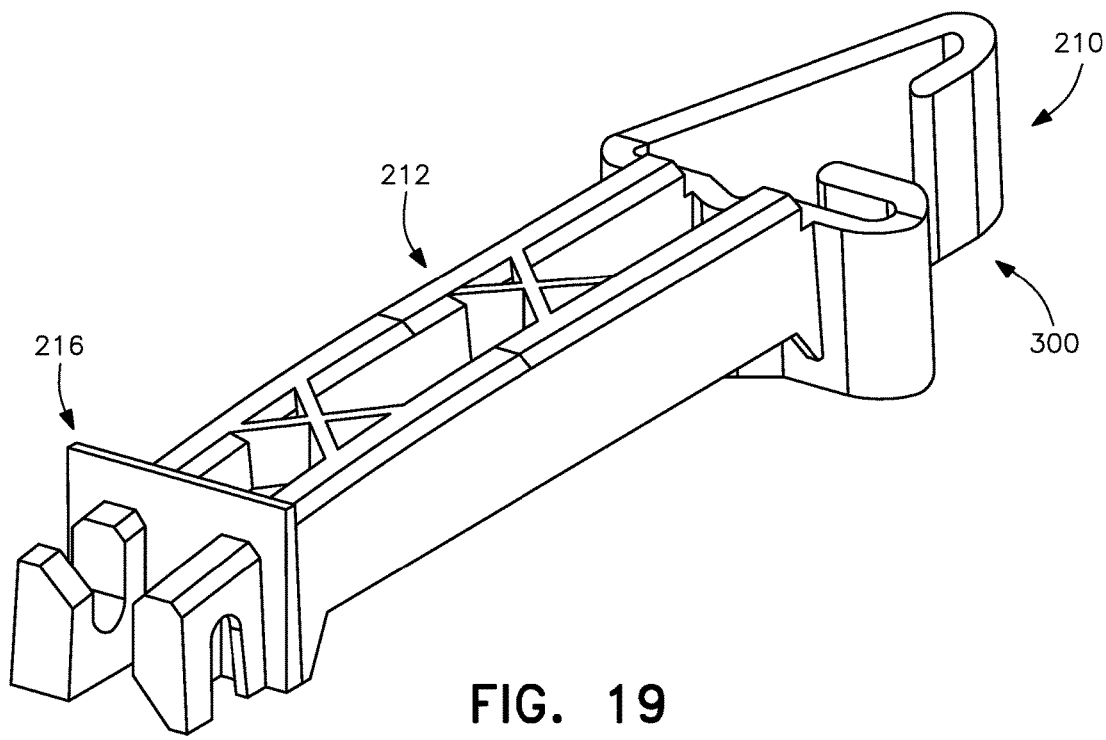
FIG. 19 is a perspective view of the electric fence insulator shown in FIG. 18.
Figure 20:
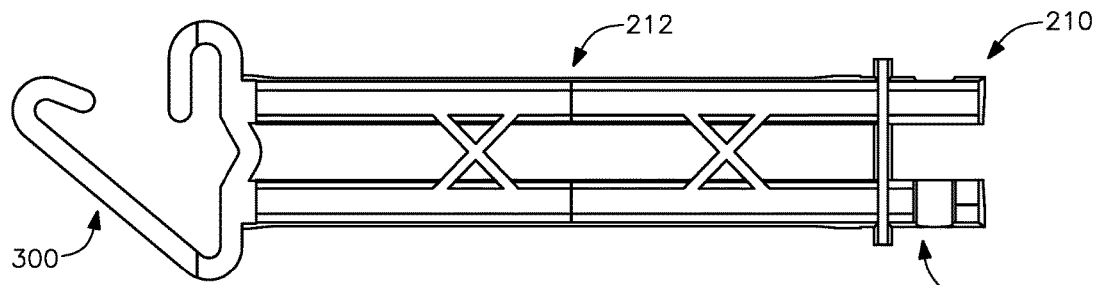
FIG. 20 is a plan view of the insulator shown in FIG. 18.

According to another version of the first embodiment shown in FIG. 10A, rather than having raised bumps on the lugs that engage with ledges and slots on the upper front sides of the angled edges, both the front and rear sides of each of the angled outer edges 36 have a textured surface 37. The downward extension of the lugs, in combination with the textured surfaces 37 on the front and rear sides of the outer edges 36, contributes to a good friction fit between the mounting ends of two stacked insulators, creating a latching structure by which the mounting ends of two adjacent stacked insulators may be overlapped and frictionally engaged with one another while the insulator bodies 12 remain essentially parallel with one another in the stack.

The body 12 of the insulator 10 projects forwardly from the mounting end 14, and generally perpendicular to the post abutment face 30, to the fence wire engaging end 16. The body 12 includes two lateral arms 44 that are generally parallel with one another. Each lateral arm 44 includes a generally flat top surface 46 with two side walls that include a shorter (height) inner wall 48 and a taller (height) outer wall 50. A space 52 (see FIG. 6) is formed between the inner and outer walls 48, 50 on the underside of the top surface 46 which is preferably open to reduce the weight of the insulator and the amount of material used in manufacture.

Figure 8:
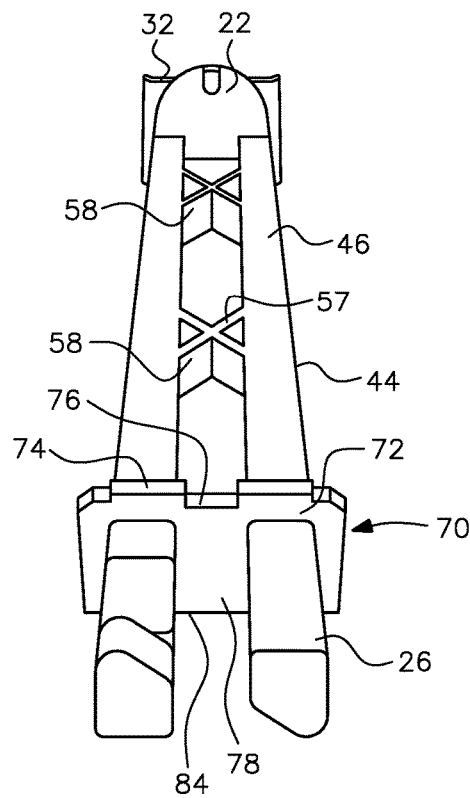
FIG. 8 is a photograph showing an upper perspective view of the insulator depicted in the drawings of FIGS. 2-6 taken from the fence wire engaging end.

Both the inner and outer walls 48, 50 extend downwardly from and generally perpendicular to the top surface 46 to end in bottom edges 54 and 56, respectively. Measuring height from the top surface 46 to their respective bottom edges 54 and 56, the height of the outer wall 50 is greater than the height of the inner wall 48. The outer surface of the outer walls 50 may be textured for better grip as shown in FIG. 10A. Alternately, the arms and other surfaces of the insulator may be smooth as shown in FIGS. 8-10.

Figure 6:
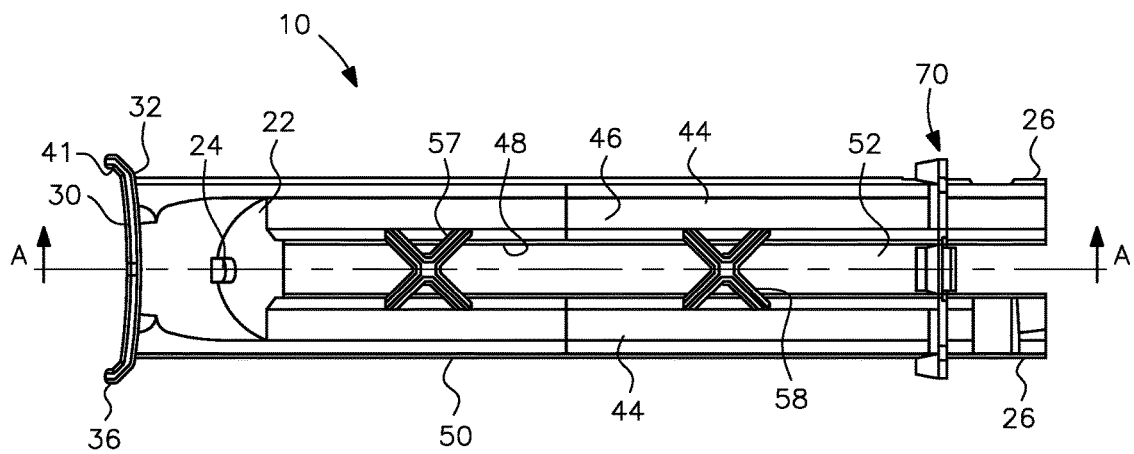
FIG. 6 is a plan view of the insulator shown in FIG. 4.
Figure 6A:
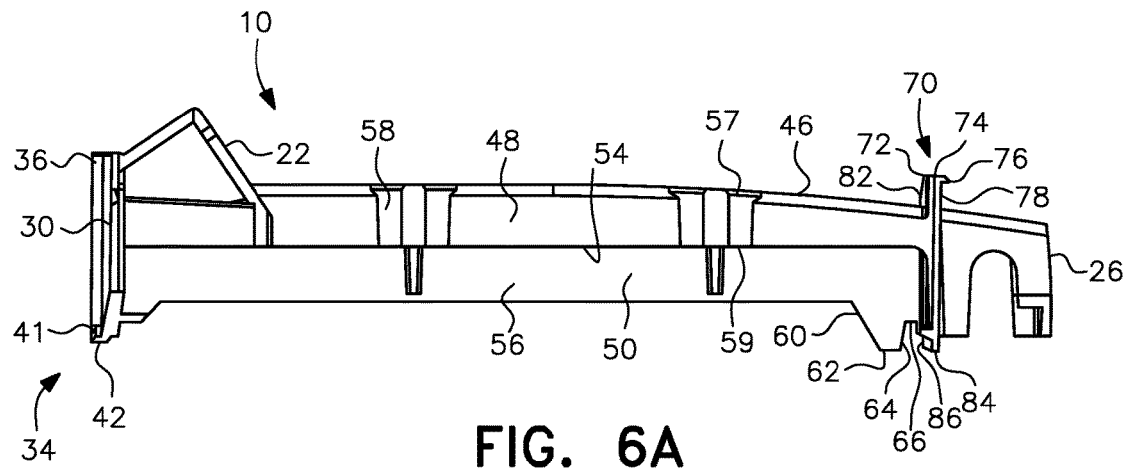
FIG. 6A is a sectional view taken along line A-A of FIG. 6.

The arms 44 are connected to one another by cross brace elements 58 that extend between the inner walls 48 of the two arms 44. The upper surface 57 of the cross braces 58 is generally flush with the flat top surface 46 of the arms 44 (see FIG. 6A), and the lower surface 59 of the cross braces 58 is generally flush with the bottom edges 54 of the inner walls 48 of the arms 44. The cross brace elements 58 rigidify the body 12 while minimizing weight and the amount of material needed to make the insulator body as compared with a solid, single arm structure like those known in the prior art.

In the first embodiment, two cross braces are used. However, a single cross brace element may be sufficient with a shorter body configuration or, in the case of a configuration as short as that shown in the second embodiment, the cross brace element may be eliminated altogether. Conversely, should the insulator body be made longer, or should additional reinforcement be considered necessary, three or even more cross braces could be included as would be understood by persons of skill in the art.

The bottom edge 56 of the outer wall 50 of each arm 44 is straight along the majority of the length of the body. A rearwardly inclined ramped portion 60 is formed adjacent the fence wire engaging end 16. The ramped portion 60 is truncated to form a flat bottom surface 62. The front side 64 of the ramped portion 60 inclines upwardly to define a channel 66 that extends transversely between the two arms 44 as will be discussed further hereinafter.

At the fence wire engaging end 16, the arms terminate in the two hook-like elements 26. According to the present invention, the two arms 44 are joined to one another and encircled by a collar, generally designated by reference numeral 70, positioned just rearwardly of the hook-like elements 26 and lust forwardly of the ramped portion 60 on the bottom edge 56 of the outer wall 50 of the arms 44.

The collar 70 forms an upwardly directed flange 72 on a top side thereof that extends above the body 12 and the hook-like elements 26. The flange 72 has a substantially straight upper edge 74 that is generally parallel with the top edge 32 of the post abutment face 30. A top lip 76 is formed on the front side 78 of the flange 72 adjacent the upper edge 74 and positioned centrally between, and above, the hook-like elements 26 (see FIG. 6A). A corresponding indent 80 is formed on the rear side 82 of the flange 72 opposite the top lip 76 (see FIG. 7).

The collar 70 has a generally straight lower edge 84 on a bottom side thereof that is substantially in horizontal alignment with the flat bottom surface 62 of the ramped portion 60 of the outer wall 50 of the arm 44. The space between the collar lower edge 84 and the front side 64 of the ramped portion 60 of the outer wall forms the channel 66 that extends transversely between the outer walls 50 of the arms 44. A bottom lip 86 is formed on the rear side 88 of the collar 70 adjacent the lower edge 84. The bottom lip 86 is positioned centrally between, and near the bottom of, the hook-like elements 26 so that the bottom lip projects into the channel 66.

Figure 2:
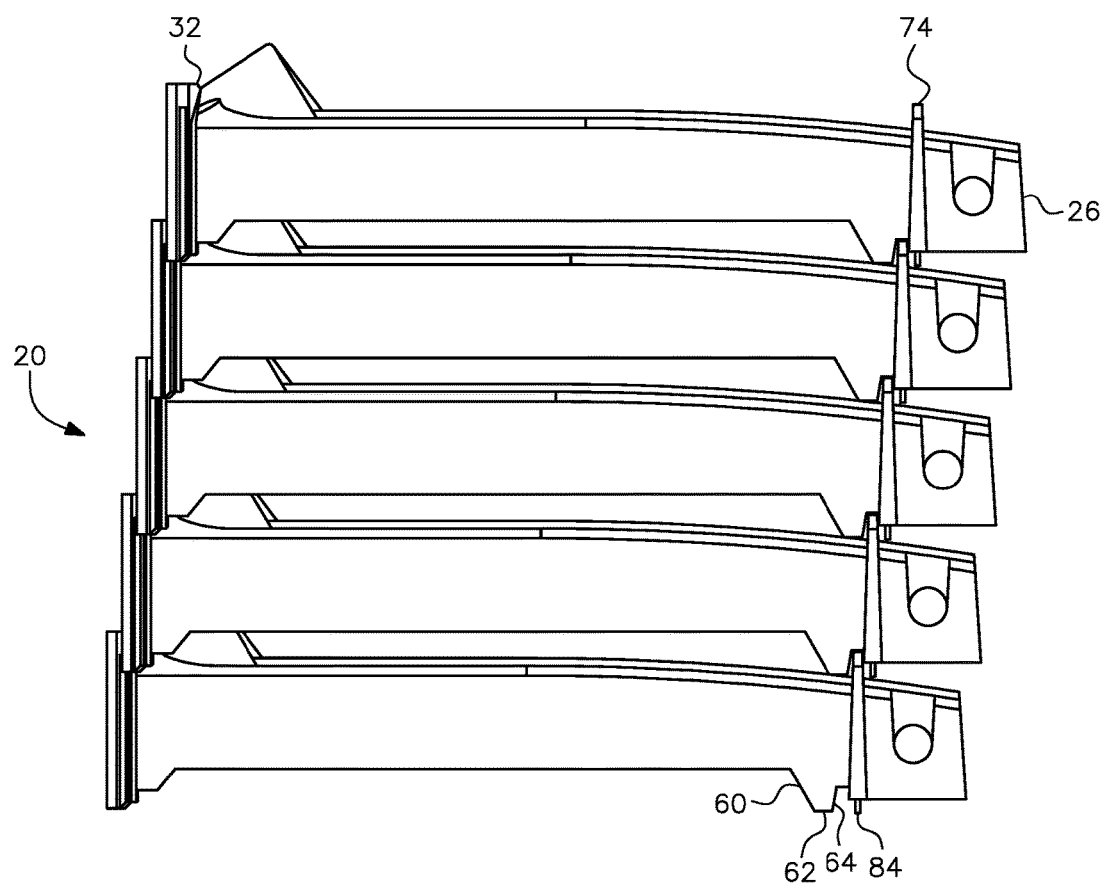
FIG. 2 shows a nested and connected stack of electric fence insulators for a wood post in accordance with a first embodiment of the present invention.
Figure 3:
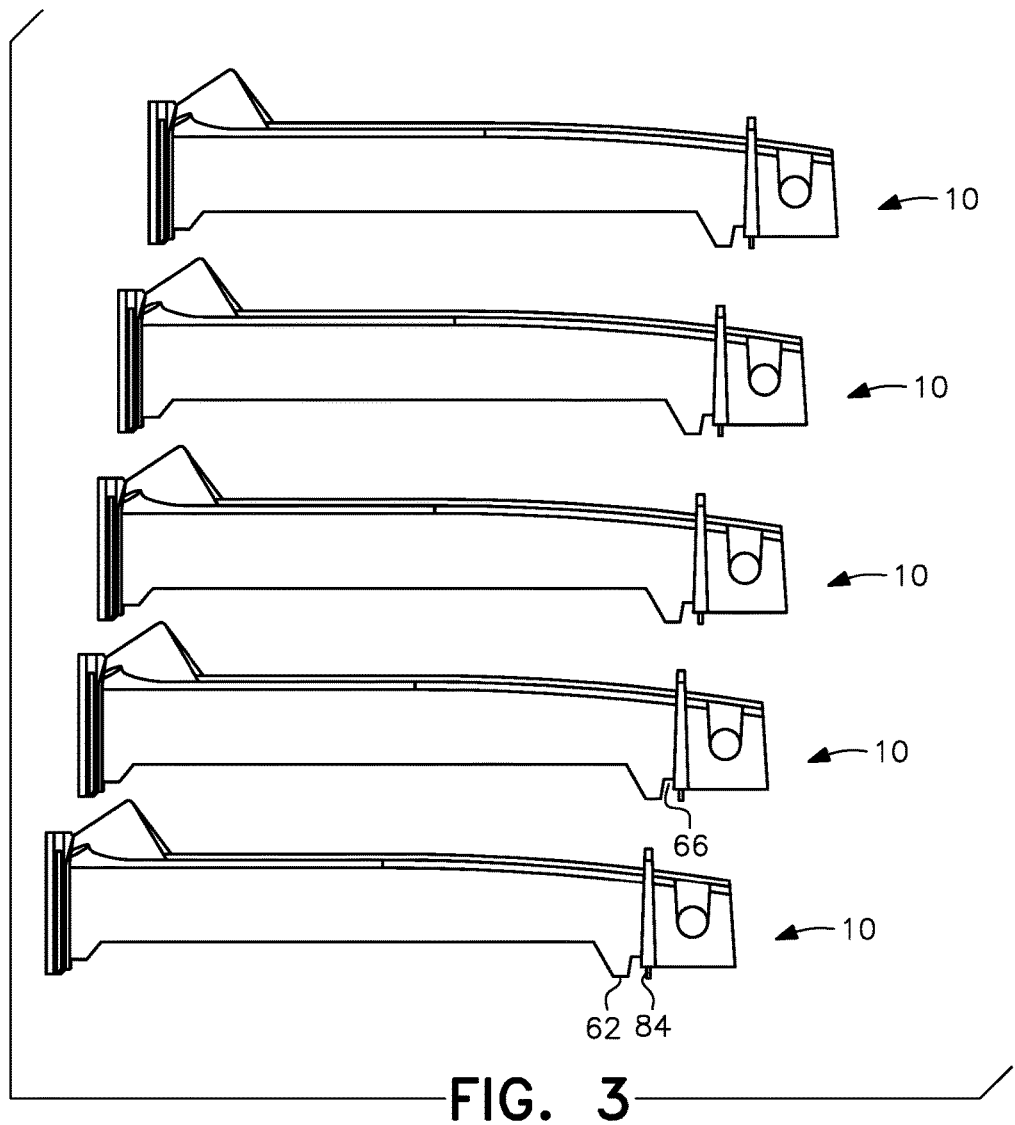
FIG. 3 is an exploded view of the electric fence insulators shown in FIG. 2.
Figure 4:
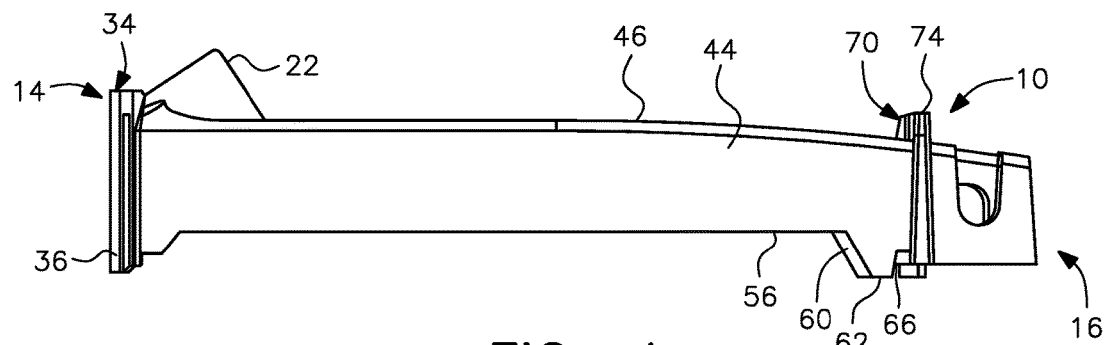
FIG. 4 is a side view of one of the electric fence insulators shown in FIGS. 2 and 3.
Figure 7:
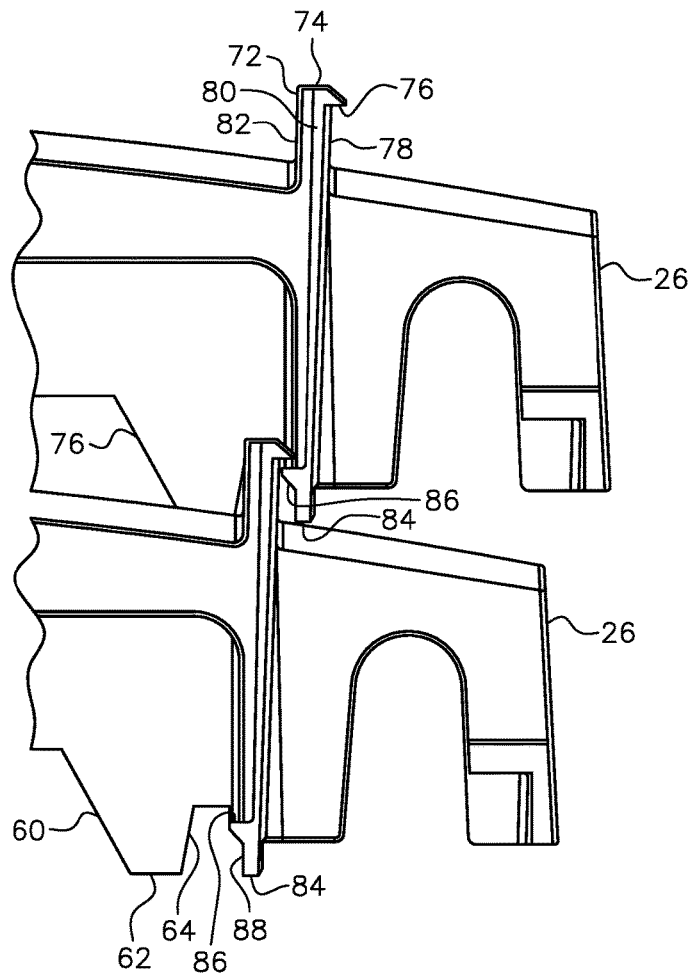
FIG. 7 is an enlarged view of the snap fit connection between the fence wire engaging ends of two insulators in accordance with the present invention.

With the foregoing structure, the insulators according to the present invention can be stacked and coupled to one another in the stacked configuration shown in FIG. 2. To connect two insulators with one on top of the other, the insulators are positioned so that the channel 66 formed adjacent the fence wire engaging end 16 on the bottom side of the top insulator is aligned with the upwardly directed flange 72 on the top side of the collar of the bottom insulator. When the two insulators are placed in a stacking orientation relative to one another, the lip 86 on the rear surface 82 of the collar of the top insulator comes into abutment with the lip 76 on the front surface 78 of the collar 70 of the bottom insulator. When force is applied to press the two insulators together, the flexibility of the material and the close tolerance between the two lips enables the lip 86 on the top insulator to be forced past the lip 76 on the, bottom insulator into the indent 80 for a snap fit engagement, as shown in FIG. 7.

With the fence wire engaging ends 16 coupled to one another through the engagement of the lips 76, 86, the lugs 42 and post abutment face 30 of the top insulator are positioned slightly forward of the angled edges 36 of the post abutment face 30 of the bottom insulator. When the mounting end 14 of the top insulator is then pressed downwardly, the bumps 41 on the lugs 42 (see FIGS. 9 and 9A) slide over the top edge 32 of the post abutment face 30 and into the slots 27 where the bumps 41 are held in engagement against the ledges 39 on the front side 33 of each angled edge 36 (see FIG. 5A). In the alternate version of the insulator shown in FIG. 10A, the rear surfaces of the lugs 42 of the top insulator frictionally engage against the textured front surfaces of the angled edges 36 of the bottom insulator. In both versions, the two insulators are then securely coupled to one another, through engagement at both ends thereof, and may be readily handled as a single unit. At the same time, the coupled insulators are easy to separate for installation, and just as easily re-coupled as needed or desired.

As evident from the foregoing, the lips on the collar that surrounds the fence wire engaging ends of the insulator provides a latching structure by which the insulator is attached to adjoining insulators above and/or below it when the insulators are stacked upon one another for shipping, sale and/or storage. The lips provide a snap-fit type of coupling although a frictional engagement may also be used along the lines of that described in connection with FIG. 10A. For example, the insulators may be manufactured such that the upwardly directed flange 72 on the top side of the collar is sized to create a friction fit within the channel 66 of an insulator stacked above it. Whether snap fit or friction fit engagements are used, the latching structure preferably includes an element formed on each of the two opposing ends of each insulator so that adjacent insulators are secured together at two points as has been described herein.

As has already been noted, the insulator body may be elongated as shown in the first embodiment of FIGS. 2-10, or may be short-coupled in accordance with the second embodiment as shown in FIGS. 11-15. In the second embodiment drawing FIGS. 11-15, elements corresponding to those shown and already described in connection with the first embodiment are identified by the reference numerals of the first embodiment but with a "1" added as a prefix for clarity as between the two embodiments. Further description of the second embodiment will not be repeated as being redundant with respect to the first embodiment as both share the same latching structure.

Other insulator body configurations are also possible including the third embodiment shown in FIGS. 16-20 directed to a T post installation, as well as others not shown including poly tap insulators, poly rope insulators, rebar, chain link fence and the like as is known in the art. The T post insulator 210 shares the same latching structure on the fence wire engaging end 216 as that of the fence wire engaging ends 16 and 116 of the first and second embodiment insulators 10 and 110, respectively, and therefore description thereof will not be repeated here. The mounting end 300 of the T post insulator 210 has a different structure than the mounting ends 14 and 114 of the first and second wood post embodiments, being configured to fit on a conventional T post as is known in the art. The mounting end 300 may be provided with an insulator latching structure (not shown) or the T post insulators may include only the latching structure on the fence wire engaging end 216. Hence, these and other insulator body styles may be accommodated to include some or all of the nesting and stackable features of the present invention without departing from the scope thereof. Therefore, the particular insulator body configurations shown in FIGS. 2-10A, 11-15 and 16-20 are illustrative only and the present invention is not intended to be limited to these three configurations.

Figure 21A:
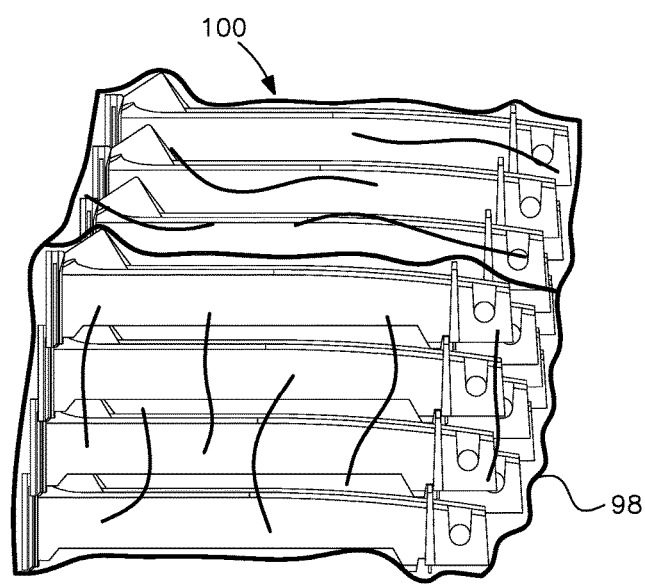
FIG. 21A is a side view of a plurality of insulators in accordance with the first embodiment coupled in four stacks and packaged as a unit of 20 insulators in plastic wrap material.
Figure 21B:
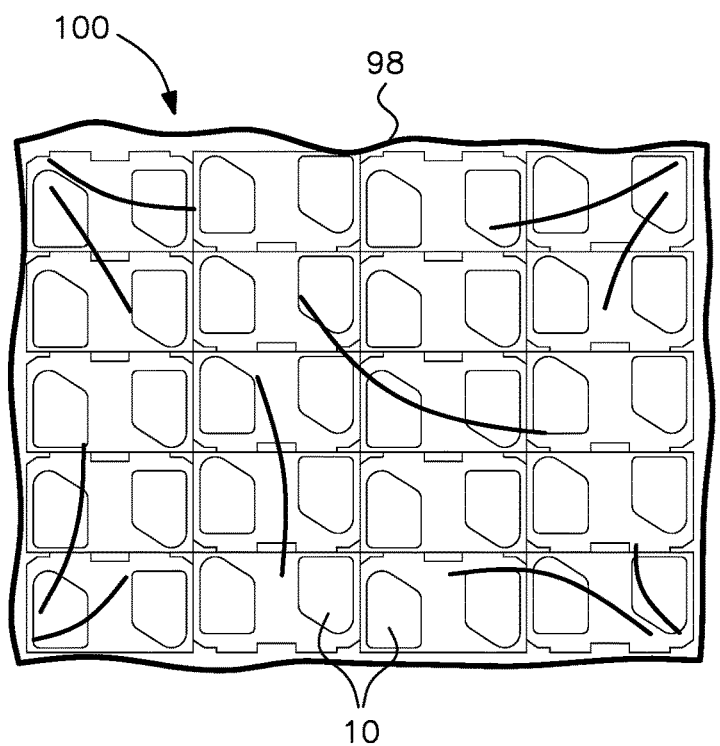
FIG. 21B is a fence engaging end view of the package shown in FIG. 21A.
Figure 21C:
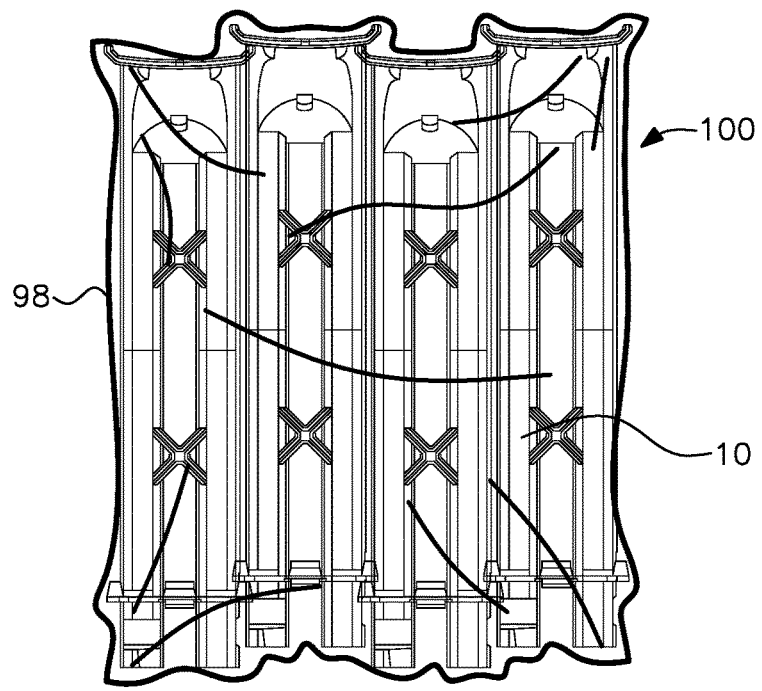
FIG. 21C is a top view of the package shown in FIGS. 21A and 21B.

In any of the foregoing configurations, the insulators according to the present invention may, when nested and connected to one another, form a stacked set of multiple interconnected and nested like insulators which can be secured in streamlined packaging such as shrink wrap, blister packs and the like for reduced shipping dimensions and efficient use of retail space. Multiple stacked sets of insulators according to the first embodiment, packaged in plastic wrap material 98 to form a single retail unit generally designated by reference numeral 100, are shown in FIGS. 21A-21C. The insulators are packaged in set numbers, such as 5 or 10 per stack, making it easy for the consumer to keep track of inventory. The packaged retail unit shown in FIGS. 21A-21C contains four stacks of five insulators per stack or a total of 20 insulators per package.

With the plurality of nested insulators packaged as shown in FIGS. 21A-21C, the consumer is able to more efficiently install a fence as the organize& relationship of the insulators eliminates the need to individually count every insulator. Rather, because the insulators are packaged in discrete units of a set number, such as 20, the consumer may easily see at a glance how many insulators are still attached to one another in the package, or bow many stacks remain, and hence how many insulators have already been taken out and/or installed The nested and coupled relationship of the insulators also facilitates storage of any extra unused insulators, as the stacks require less storage space than conventional bulk bags like that shown in FIG. 1 in which the insulators are randomly positioned and movable with respect to one another as the bags are handled.

The electric fence insulators according to the present invention are preferably injection molded out of plastic.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A stackable electric fence insulator comprising a body having a mounting end and an electric fence wire engaging end, said body including at least one latching structure configured to secure the insulator to a second insulator of same construction in a nested and stacked arrangement above and/or below said insulator.

2. The stackable electric fence insulator as set forth in claim 1, wherein the at least one latching structure forms a snap-fit connection with the second insulator.

3. The stackable electric fence insulator as set forth in claim 1, wherein the body includes a first latching structure on the electric fence wire engaging end and a second latching structure on the mounting end.

4. The stackable electric fence insulator as set forth in claim 3, wherein the first latching structure forms a first snap-fit connection and the second latching structure forms a second snap-fit connection.

5. The stackable electric fence insulator as set forth in claim 1, wherein said at least one latching structure includes a collar having an upwardly directed flange adjacent the electric fence wire engaging end, said flange having a first lip adjacent an upper edge thereof, and said at least one latching structure further including a second lip on a lower surface of said body adjacent a lower edge of said collar, said first lip on each insulator engaging with the second lip on an adjacent insulator connected above said insulator.

6. The stackable electric fence insulator as set forth in claim 5, wherein the upwardly projecting flange includes a flange lip and said downwardly opening channel includes a channel lip, said flange lip having a snap fit engagement with a corresponding channel lip on the second insulator, and said channel lip on said insulator having a snap fit engagement with a corresponding flange lip on said third insulator when the insulator, second insulator and third insulator are stacked and coupled with one another.

7. The stackable electric fence insulator as set forth in claim 1, wherein the mounting end includes a post abutment face having a top edge and two angled side edges, a bottom end of each angled side edge having a lug, said at least one latching structure including a bump on a rear side of said lug and a ledge formed in a front side of said angled side edges near the top edge, said lug bump of said insulator engaging beneath a corresponding ledge on the angled side edge of a second insulator positioned below said insulator with a snap fit when the two insulators are stacked and coupled together.

8. The stackable electric fence insulator as set forth in claim 1, in combination with a plurality of insulators of same construction in a nested and connected relationship to one another, one on top of the other to form a stacked set of insulators secured to one another by said latching structure, and a packaging that surrounds and contains said stacked set of electric fence insulators in said nested and connected relationship.

9. electric fence insulator set comprising a plurality of electric fence insulators stacked one on top of another in a nested and connected relationship, each insulator including a body having a mounting end and an electric fence wire engaging end and including at least one latching structure on an upper surface and at least one latching structure on a lower surface engage with a complementary latching structure on an adjacent insulator of said set connected above and below, respectively.

10. The electric fence insulator set as provided in claim 9, wherein said at least one latching structure on the upper surface includes a collar having an upwardly directed flange adjacent the electric fence wire engaging end, said flange having a first lip adjacent an upper edge thereof, and said at least one latching structure on the lower surface includes a second lip adjacent a lower edge of said collar, said first lip on each insulator engaging with the second lip on an adjacent insulator connected above.

11. The electric fence insulator set as provided in claim 10, further comprising a second latching structure on the lower surface of each insulator adjacent the mounting end of the body, and a second latching structure on the upper surface of each insulator adjacent the mounting end of the body.

12. The electric fence insulator set as provided in claim 11, wherein said mounting end includes a post abutment face having a generally flat top edge and two sides with angled side edges, said second latching structure on the lower surface including a lug on a bottom end of each angled side edge, said second latching structure on the upper surface including a ledge formed in a front side of said angled side edges near the top edge, said lug on each insulator engaging beneath a corresponding ledge on the angled side edge of an adjacent insulator connected below.

13. The electric fence insulator set as provided in claim 10, in combination with a packaging that surrounds and contains said electric fence insulator set with said insulators in said nested and connected relationship therein.

14. An electric fence insulator package comprising a plurality of at least partly nested electric fence insulators secured to one another in a stacked arrangement by a latching structure formed on each insulator, and a packaging surrounding and containing the stacked as of insulators, each insulator having a body with a mounting end and an electric fence wire engaging end and including at least one latching structure on an upper surface and at least one latching structure on a lower surface to engage with a complementary latching structure on an adjacent insulator that is connected above and below, respectively, in the stacked arrangement of insulators in said package.

15. The electric fence insulator package set forth in claim 14, wherein the electric fence wire engaging end of the body has a first latching structure and the mounting end of the body has a second latching structure, the first and second latching structures being longitudinally spaced from one another by said body, the first latching structure forming a first snap-fit connection and the second latching structure forming a second snap-fit connection with an adjacent insulator connected above or below in the stacked arrangement of insulators.

16. The electric fence insulator package set forth in claim 15, wherein the first latching structure includes an upwardly projecting flange on an upper side of the body and a downwardly opening channel on a lower side of the body, the upwardly projecting flange being received in a corresponding channel of a second insulator stacked above said insulator and said downwardly opening channel receiving a corresponding flange of a third insulator stacked below said insulator.

17. The electric fence insulator package set forth in claim 16, wherein the upwardly projecting flange includes a flange lip and said downwardly opening channel includes a channel lip, said flange lip having a snap fit engagement with a corresponding channel lip on the second insulator, and said channel lip on said insulator having a snap fit engagement with a corresponding flange lip on said third insulator in the stacked arrangement.

18. The electric fence insulator package set forth in claim 15, wherein said mounting end includes a post abutment face having a top edge and two angled side edges, said second latching structure including a lug on a bottom end of each angled side edge, said lug having a bump on a rear side thereof, and a ledge formed in a front side of said angled side edge near the top edge, said lug bump of each insulator engaging with a corresponding ledge on the angled side edge of an adjacent connected insulator positioned beneath said insulator in said package.

19. The electric fence insulator package set forth in claim 18, wherein the angled edge includes a slot formed under the ledge, the bump on the rear side of said lug being engaged in the slot beneath the ledge with a snap fit when the insulators are coupled together.

20. The electric fence insulator package set forth in claim 14, wherein said at least one latching structure includes a collar having an upwardly directed flange, said flange having a first lip adjacent an upper edge thereof, and said at least one latching structure further including a second lip on a lower surface of said body adjacent a lower edge of said collar, said first lip on each. insulator engaging with the second lip on an adjacent insulator connected above said insulator.

* * * * *